United States Patent [19]
Collins

[11] 3,767,970
[45] Oct. 23, 1973

[54] TURN ON/TURN OFF CIRCUIT FOR THE DIRECT CURRENT OPERATION OF GASEOUS DISCHARGE LAMPS

[75] Inventor: James R. Collins, Fort Wayne, Ind.

[73] Assignee: General Electric Company, Indianapolis, Ind.

[22] Filed: Nov. 1, 1972

[21] Appl. No.: 302,794

[52] U.S. Cl.... 315/241 R, 315/DIG. 5, 315/DIG. 7, 315/227 R, 315/311
[51] Int. Cl. ........................................... H05b 41/18
[58] Field of Search.................. 315/DIG. 5, DIG. 7, 315/227 R, 241 R, 307, 311

[56] References Cited
UNITED STATES PATENTS
3,066,241  11/1962  Palmer............................ 315/307 X

*Primary Examiner*—Roy Lake
*Assistant Examiner*—James B. Mullins
*Attorney*—John M. Stoudt el al.

[57] ABSTRACT

There is provided a circuit for solid-state starting and ballasting gaseous discharge lamps operating on direct current. The circuit provides a means of positive turn off and turn on of gaseous discharge lamps. A direct current source is connected in series with a starting pulse transformer, a gaseous discharge lamp and a constant current ballast transistor. A resistor is connected across the lamp to shunt the ballast transistor off-state leakage current away from the lamp and a second transistor is connected to the base of the ballast transistor to provide a shunt path for the off-state leakage current away from the base-emitter junction of the ballast transistor. The starting circuit for the lamp, which comprises an SCR connected in series with a pulse transformer primary winding and a capacitor, is separated from the transistor ballast. A charging resistor is connected between the direct current source and the starting means, the value being large enough to conduct current below the holding current of the SCR so that it will commutate when gate drive is removed. The gate terminal of the SCR and the base of the ballast transistor are connected to a common control signal input. A second capacitor is connected to the direct current source and to the collector of the ballast transistor to bypass starting voltage spikes from the ballast transistor and to aid in starting the lamp.

13 Claims, 1 Drawing Figure

PATENTED OCT 23 1973  3,767,970

TURN ON/TURN OFF CIRCUIT FOR THE DIRECT CURRENT OPERATION OF GASEOUS DISCHARGE LAMPS

BACKGROUND OF THE INVENTION

This invention relates to an improved solid-state ballast circuit operating at least one gaseous discharge lamp on direct current. More particularly, it relates to an improved DC ballast circuit which utilizes pulse starting and transistor ballasting and regulating, including means of providing assurance of lamp turn on and complete lamp turn off at preselected times. The present invention is an improvement of the invention of copending application serial number (attorney docket 58-ST-4063) co-invented by Thomas G. West, James R. Collins and Thomas J. Broski and assigned to the General Electric Company, assignee of the present invention, which application is specifically incorporated herein by reference.

When it was desired to operate a gaseous discharge lamp on direct current using a transistor regulator circuit as a ballast and as a switch for on-off operation, two problems were known to occur. One problem occurred when it was desired to turn the lamp off by removing base drive from the ballast transistor. The lamp often continued to glow at a very low light level. The glow condition indicated that the transistor ballast off-state leakage current which flowed through the lamp did not always fall below the glow-sustaining threshold required for complete lamp extinction. In the prior art embodiments the ballast transistor switch was turned off in the open-base mode. The leakage current of the reverse biased collector-base junction of the ballast transistor consequently flowed into the base-emitter junction and was amplified by the forward current gain. Although the characteristic value of this leakage current for many transistors was below the glow-sustaining threshold, it was clear that an intolerable situation existed considering the nature of production lot variation of this characteristic of transistors, aging, and temperature effects. The glow-sustaining effect may occur during operation, as the transistor warms up and leakage current increases due to increasing junction temperature. The second problem which was noticed was the fact that some lamps would not turn on when a control input signal was applied to a starting circuit. It was found that this problem was caused by insufficient voltage on a energy storage discharge capacitor in the starting circuit. Thus, when gate drive signal was applied to a discharge thyristor (SCR) insufficient voltage would be present to be induced in the secondary of the pulse transformer for igniting the lamp. In the prior art embodiments the starting circuit was interconnected with the ballasting circuit as to have a stored charge depending upon the characteristic off-state leakage current of the ballast transistor. The effect of relatively high leakage current was to reduce the voltage on the discharge capacitor. As the discharge capacitor voltage level was reduced by higher ballast transistor leakage current the induced voltage available to start the lamp was reduced far enough there would eventually be insufficient pulse starting voltage to ignite the lamp. As in the turn-off problem this behavior might occur after ballast transistor warmup.

SUMMARY OF THE INVENTION

Accordingly, it is a general object of this invention to provide an improved solid-state ballast and starting circuit operating gaseous discharge lamps on direct current.

Another object is to provide a solid-state ballast and starting circuit including means for preventing lamp glow after substantial turn-off of the solid-state ballast.

Another object is to provide a solid-state ballast and starting circuit including means for insuring dependable lamp turn-on at a preselected time.

Another object is to provide a transistorized ballast circuit including a means of minimizing off-state ballast transistor leakage current effects in gaseous discharge lamps and a means for preventing the leakage current from affecting lamp starting.

Another object is to provide a solid-state ballast circuit operating on direct current including a regulated circuit operating a gaseous discharge lamp where the lamp turns on everytime at a preselected time and completely off everytime at a preselected time.

In accordance with one form of this invention there is provided a circuit for operating gaseous discharge lamps operating on direct current. A starting circuit is connected between the direct current source and the lamp and comprises an SCR, a capacitor and a transformer. A charging resistor is connected to the capacitor and provides current below the holding current of the SCR so that the SCR will turn off at a predetermined time. The starting circuit is separated from the ballast transistor thus preventing the ballast transistor leakage from affecting the level of stored charge in the discharge capacitor of the starting circuit which can reduce the starting voltage to a level insufficient to turn-on the lamp. A solid-state ballast which includes a transistor is connected between the lamp and the DC power source. A resistor, connected across the lamp, and a second transistor, connected across the base-emitter junction of the ballast transistor, aid in preventing appreciable leakage current through the lamp which causes it to glow. A second capacitor is connected to the DC power source and the collector of the ballast transistor to provide a high frequency shunt and initial collector current for the ballast transistor at the turn on instant. The ballast transistor is regulated by a resistance and Zener diode feedback arrangement. The ballast transistor and the SCR in the starting circuit are gated on by common control signal input.

BRIEF DESCRIPTION OF THE DRAWINGS

The subject matter which is regarded as the invention is set forth in the appended claims. The invention itself, however, together with further objects and advantages thereof may be better understood by reference to the following description taken in conjunction with the accompanying drawings in which:

DESCRIPTION OF THE PREFERRED EMBODIMENTS

Figure 1:
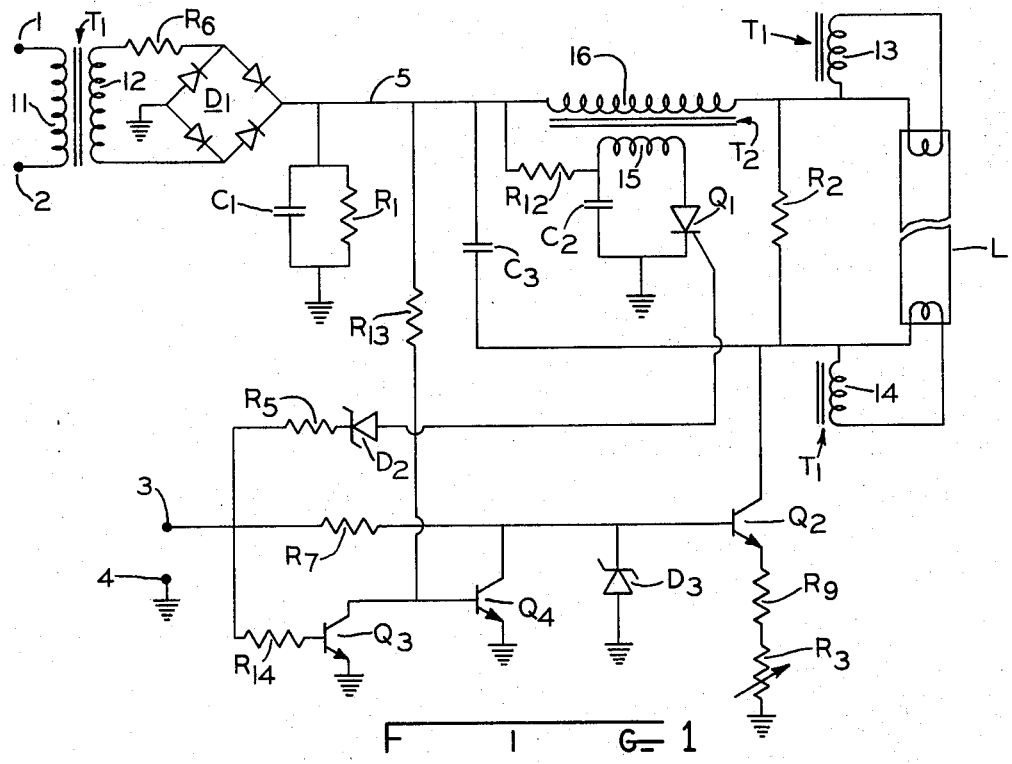
FIG. 1 is a schematic circuit diagram of an improved solid-state ballast circuit incorporating one embodiment of the present invention.

Referring now more particularly to FIG. 1, AC line power is received across terminals 1 and 2 and primary winding 11 of transformer $T_1$. Voltage is transformed by transformer $T_1$ and applied across secondary windings 12, 13 and 14. Secondary windings 13 and 14 are connected to gaseous discharge lamp L to provide a filament heating current for the lamp. Full wave diode bridge $D_1$ is connected across secondary winding 12 of transformer $T_1$ and resistor $R_6$ to provide a rectified AC signal. Capacitor $C_1$ and resistor $R_1$ are connected in parallel and across output of diode bridge $D_1$ to provide a smooth DC signal and functions as a source of DC energy on wire 5. Secondary winding 16 of transformer $T_2$ is connected between the full wave DC source and gaseous discharge lamp L to provide a starting voltage for the gaseous discharge lamp L. Since the source provides a direct current signal, the secondary winding of transformer $T_2$ will have essentially no ballasting effects for the lamp. The starting circuit for the lamp comprises thyristor or SCR $Q_1$ having its cathode connected to one side of starting capacitor $C_2$ and to ground and having its anode connected to one side of primary winding 15 of transformer $T_2$. The other side of capacitor $C_2$ is connected to the other side of primary winding 15. Charging resistor $R_{12}$ is connected to the DC source and between capacitor $C_2$ and primary winding 15 and provides a charging path for capacitor $C_2$. Capacitor $C_2$ is charged to a level approximating that of capacitor $C_1$ because the IR drop of the charging resistor $R_{12}$, due to the leakage current of SCR $Q_1$ in the off-state, is very low compared to the voltage of capacitor $C_1$ voltage. Resistor $R_{12}$ is large enough such that the current through $R_{12}$ is below the necessary holding current for SCR $Q_1$ so that the SCR will turn off and stay off when the gate signal is removed from the SCR. However, resistor $R_{12}$ is small enough so that the RC time constant of $R_{12}$ and $C_2$ is short enough that $C_2$ will charge completely before SCR $Q_1$ is gated on. The gate of SCR $Q_1$ is connected to control signal input terminal 3 through resistor $R_5$ and Zener diode $D_2$. Zener diode $D_2$ provides a reference threshold for the gate of SCR $Q_1$ so that the possibility of false triggering of SCR $Q_1$ is lessened.

Ballast transistor $Q_2$, which is a power transistor, has its collector connected to the gaseous discharge lamp L to provide the ballasting function for the lamp so that the lamp will not draw current high enough for lamp destruction. Zener diode $D_3$ is connected between the base of transistor $Q_2$ and ground. Resistor $R_9$ and variable resistor $R_3$ are connected to the emitter of transistor $Q_2$ and to Zener diode $D_3$ through ground. This diode and these resistors provide a regulation function for transistor $Q_2$ utilizing a feedback path from its emitter to its base. The regulation feature is more thoroughly explained in application serial number (attorney docket 58-ST-4063) cited above.

It should be noted that the starting circuit and the ballast transistor are isolated from one another. That is, capacitor $C_2$, in the starting circuit is no longer connected to the collector of ballast transistor $Q_2$ as was done in the prior art. The charge on capacitor $C_2$ cannot leak off through the collector base junction of transistor $Q_2$. The ballasting circuit, which includes transistor $Q_2$, resistor $R_3$ and $R_9$, and Zener diode $D_3$, and the starting circuit are substantially in parallel. A change in the ballasting circuit will not significantly affect the starting circuit.

Resistor $R_2$ is connected across lamp L and to the collector of transistor $Q_2$ to shunt transistor $Q_2$'s off-state leakage current around the lamp. Off-state leakage current occurs when transistor $Q_2$ is turned off. Resistor $R_2$ is small enough so that its IR drop caused by transistor $Q_2$ leakage current is below the glow sustaining voltage of lamp L thus guaranteeing complete turn-off of lamp L.

The base of transistor $Q_2$ is connected to control signal input terminal 3 through resistor $R_7$. Transistor $Q_3$ is also connected to control signal input terminal 3 from its base through resistor $R_{14}$. Transistor $Q_4$ is connected in cascade with transistor $Q_3$, i.e. the base of transistor $Q_4$ is connected to the collector of transistor $Q_3$ and the collector of transistor $Q_4$ is connected to the base of transistor $Q_2$. The emitter of transistors $Q_3$ and $Q_4$ are grounded. Transistor $Q_4$ provides a shunt path during the lamp off-state for the collector-base junction reverse leakage current of transistor $Q_2$ which would otherwise pass into the base-emitter junction and thus be amplified by the forward current gain of transistor $Q_2$. Transistor $Q_3$ acts as an inverter so that when transistor $Q_3$ is on transistor $Q_4$ is off and vice versa. Transistors $Q_3$ and $Q_4$ are switches which operate in either the cut-off or the saturation mode. Resistor $R_{13}$ is connected between the DC source and the connection of transistor $Q_3$ between the collector and the base of transistor $Q_4$.

Capacitor $C_3$ is connected to the DC source and to the collector of transistor $Q_2$ to provide an inital collector current during the lamp starting instant for transistor $Q_2$, and furthermore to provide a high frequency shunt path to bypass the high voltage starting pulse from the ballast transistor $Q_2$. The need for initial collector current for transistor $Q_2$ occurs because of a potential race condition between transistor $Q_2$ and SCR $Q_1$. The transistor and SCR are controlled by a common control signal source across terminals 3 and 4. If there were no initial collector current for transistor $Q_2$ and if transistor $Q_2$ turned on before SCR $Q_1$ turned on then control signal input terminal 3 would see a relatively low impedance path through the base-emitter junction of transistor $Q_2$ and almost all of the current from source 3 would flow through this path. There would then be insufficient gate current for SCR $Q_1$ to turn it on properly. This could result in poor turn on of SCR $Q_1$ or no starting voltage at all for the lamp. By placing capacitor $C_3$ between the collector of transistor $Q_2$ and the DC source, the capacitor will charge through the collector-emitter path of transistor $Q_2$ thus raising the input impedance of transistor $Q_2$. Since this impedance is high there will be ample gate current drawn by the SCR for turning on the SCR. Furthermore, since capacitor $C_3$ is connected to one side of secondary winding 16 and one side of lamp L it will provide a return path for excess stored energy existing in secondary winding 16 after lamp L comes on.

In operation, capacitor $C_2$ is charged from the source of smooth DC on lead 5 through resistor $R_{12}$. This charge will not leak off because capacitor $C_2$ substantially is separated from potentially leaky transistor $Q_2$. The lamp is turned on by the application of a voltage across control terminals 3 and 4. SCR $Q_1$ is gated on, discharging capacitor $C_2$ through primary winding 15. This induces a lamp starting voltage in secondary winding 16. Transistor $Q_2$ comes on approximately contemporaneously with SCR $Q_1$ and charges capacitor $C_3$. By providing initial collector current for the transistor in this manner a race condition between SCR $Q_1$ and transistor $Q_2$ is avoided. Lamp L then comes on and is ballasted by transistor $Q_2$. Transistor $Q_2$ is regulated by the feedback circuit comprising resistors $R_3$ and $R_9$ and Zener diode $D_3$. Transistor $Q_3$ also comes on with the application of a voltage across control terminals 3 and 4. Transistor $Q_4$ is held off by the inverter characteristic of transistor $Q_3$.

When it is desired to turn lamp L off the voltage is removed from terminals 3 and 4. SCR $Q_1$ commutates off because its current will fall below the required holding current. Transistor $Q_3$ is turned off, thus allowing transistor $Q_4$ to come on. Transistor $Q_2$ is turned off except for leakage current which is drawn through its collector-base junction and further through transistor $Q_4$. This leakage current is shunted around lamp L through resistor $R_2$. The voltage across resistor $R_2$ is lower than the glow sustaining voltage of lamp L. The lamp turns completely off in this manner.

A circuit as set forth in FIG. 1 has been built and operated with components having the following values:

| | |
|---|---|
| Lamp L | ⅝" 16½" fluorescent |
| Diodes in bridge $D_1$ | (1A, 200V) |
| Zener diode $D_2$ | (12V, 1/2 Watt) |
| Zener diode $D_3$ | (5.6V, 1/2 Watt) |
| Transistor $Q_2$ | (3.5A, 200V) |
| Transistor $Q_3$ | 2N3392 signal level |
| Transistor $Q_4$ | 2N3392 signal level |
| Capacitor $C_1$ | 100 microfarad, 150V |
| Capacitor $C_2$ | .33 microfarad, 200V |
| Capacitor $C_3$ | .1 microfarad, 200V |
| Transformer $T_1$ | primary 11 – 625 turns |
| | secondary 12 – 499 turns |
| | secondary 13 – 23 turns |
| | secondary 14 – 25 turns |
| | secondary 15 – 20 turns |
| Transformer $T_2$ | primary 15 – 20 turns |
| | secondary 16 – 25 turns |
| SCR $Q_1$ | RCA 40654 (7A, 200V) |
| Resistor $R_1$ | 100 kilohms, ½ watt |
| Resistor $R_2$ | 41 kilohms, ½ watt |
| Resistor $R_3$ | 30 ohm, 3 watt |
| Resistor $R_5$ | 330 ohm, ½ watt |
| Resistor $R_7$ | 820 ohms, ½ watt |
| Resistor $R_9$ | 10 ohms 2 watt |
| Resistor $R_{12}$ | 100 kilohms, ½ watt |
| Resistor $R_{13}$ | 100 kilohms, ½ watt |
| Resistor $R_{14}$ | 12 kilohms, ½ watt |

Figure 2:
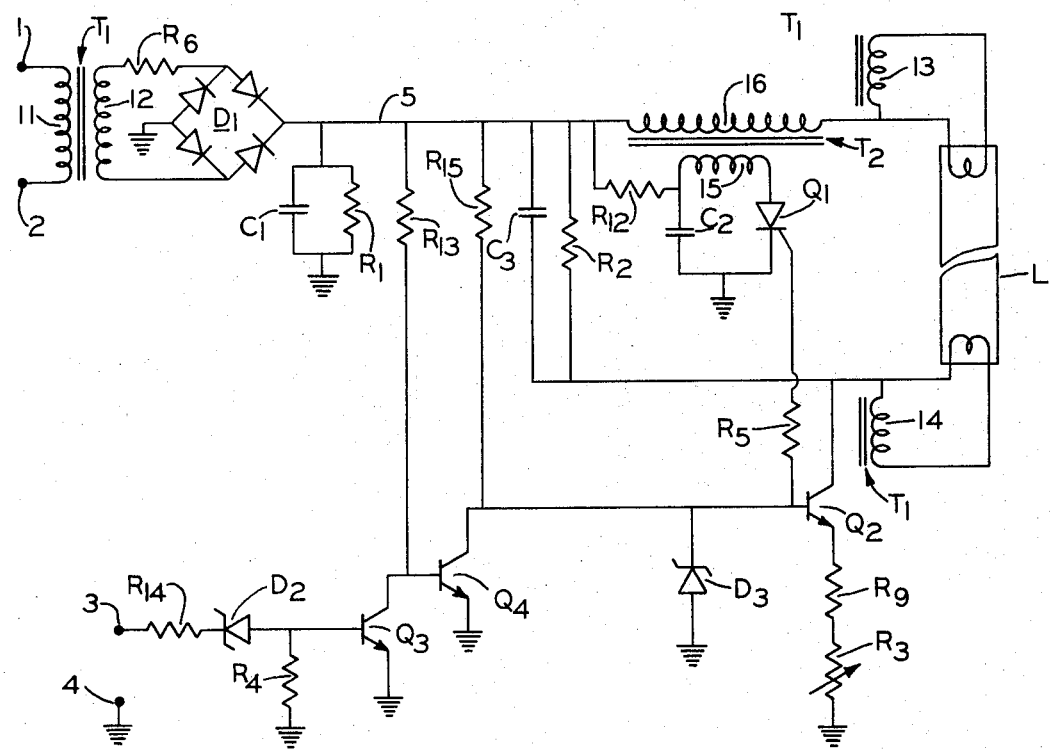
FIG. 2 is a schematic circuit diagram of an improved solid-state ballast circuit for use when a very low control current is required incorporating another embodiment of the present invention.

The circuit of FIG. 2 is very similar to the circuit of FIG. 1 except that the design of FIG. 2 is for a very low input current control signal, therefore, it is undesirable to have current division in three separate paths as shown in FIG. 1. In FIG. 2 transistors $Q_3$ and $Q_4$ are again connected in cascade but are further cascaded with transistor $Q_2$. The gate of SCR $Q_1$ is connected directly to the base of transistor $Q_2$ through resistor $R_5$. Bias resistor $R_{15}$ is connected to the collector of transistor $Q_4$ and to the base of transistor $Q_2$ to provide a circuit path for the collector of transistor $Q_4$ and the base of transistor $Q_2$. Another change is that resistor $R_2$ is connected directly to the DC source to avoid having a high voltage pulse impressed across it from the starting circuit. Zener diode $D_2$ is connected to the base of transistor $Q_3$.

From the foregoing description of the various embodiments of the invention it will be apparent that many modifications may be made therein. It will be understood, however, that these embodiments of the invention are intended as exemplification of the invention only and that the invention is not limited thereto. For example, all of the transistors in FIGS. 1 and 2 are shown to be NPN transistors. PNP transistors could be used in their place without radically changing the circuit. It is to be understood, therefore, that it is intended in the appended claims to cover all such modifications as fall within the true spirit and scope of the invention.

What is claimed as new and desire to secure by Letters Patent of the United States is:

1. A circuit for operating at least one gaseous lamp comprising:
   input means for connecting the circuit to a DC source; starting means connected to said input means and to the lamp;
   solid-state ballast connected to the lamp;
   first resistance means connected to at least one side of the lamp and to said solid-state ballast for shunting leakage current drawn by said solid-state ballast away from the lamp, said first resistance means of a size such that its voltage drop is below the glow sustaining voltage of the lamp.

2. A circuit as set forth in claim 1 wherein said solid-state ballast includes a first transistor having a base, emitter, and a collector; and further including shunt means connected between said base and said emitter of said first transistor for shunting leakage current through said collector and said base and away from said emitter of said first transistor.

3. A circuit as set forth in claim 2 wherein said shunt means includes a second transistor having a base, an emitter, and a collector; said collector of said second transistor being connected to said base of said first transistor.

4. A circuit as set forth in claim 1 wherein said starting means is substantially isolated from said solid-state ballast.

5. A circuit as set forth in claim 4 wherein said starting means includes:
   a capacitance, a thyristor, and a primary winding of a pulse transformer connected in a series loop;
   a second resistance means connected to the junction of said capacitance and said primary winding and to said input means, and a secondary winding of said pulse transformer connected to the lamp and closely coupled with said primary winding.

6. A circuit as set forth in claim 5 wherein:
   the value of said second resistance means is such that the level of current through said resistance means is below the minimum holding current level of said thyristor.

7. A circuit as set forth in claim 5 wherein the gate said thyristor and solid-state ballast are connected to a common control terminal.

8. A circuit as set forth in claim 1 further including:
   a capacitance connected between said input means and said solid-state ballast for providing an initial current for said solid-state ballast and further for providing a high frequency shunt path away from said solid-state ballast.

9. A circuit as set forth in claim 1 further including regulation means connected to said solid-state ballast.

10. A circuit as set forth in claim 9 wherein:
    said solid-state ballast includes a transistor connected to the lamp; said regulation means includes a Zener diode and resistance connected to said transistor in a feedback arrangement; and means for connecting said transistor to a control signal.

11. A circuit as set forth in claim 1 wherein said starting means includes a transformer secondary winding, one side of said first resistance means being connected between said secondary winding and said input means.

12. A circuit as set forth in claim 1 wherein said first resistance means is connected across the lamp.

13. A circuit for operating at least one gaseous discharge lamp comprising:
   input means for connecting the circuit to a DC source;
   pulse starting means including a thyristor having an anode, a cathode, and a gate, a starting capacitor having one side connected to said cathode of said thyristor and ground, a transformer having primary and secondary windings, said primary winding being connected between said anode of said thyristor and the other side of said starting capacitor, said secondary winding being connected between said input means and the lamp, a charging resistor connected between the other side of said starting capacitor and said input means; ballast means including a ballast transistor having a base, an emitter, and a collector, said collector connected to the lamp;
   regulation means including resistance means connected between said emitter of said ballast transistor and ground, and a Zener diode connected between said base of said ballast transistor and ground;
   control means connected to said base of said ballast transistor and said gate of said thyristor;
   shunt resistance connected to said input means and to said collector of said ballast transistor;
   current initiating capacitor connected between said input means and said collector of said ballast transistor;
   a shunt transistor having a base, an emitter, and a collector, said collector of said shunt transistor connected to said base of said ballast transistor, said emitter of said shunt transistor connected to ground.

* * * * *

UNITED STATES PATENT OFFICE
CERTIFICATE OF CORRECTION

Patent No. 3,767,970     Dated October 23, 1973

Inventor(s) James R. Collins

It is certified that error appears in the above-identified patent and that said Letters Patent are hereby corrected as shown below:

Col. 1, lines 14 and 15, delete "(attorney docket 58-ST-4063)" and insert -- 302,793 filed November 1, 1972 --.

Col. 3, lines 52 and 53, delete "(attorney docket 58-ST-4063)" and insert -- 302,793 --.

Signed and sealed this 18th day of June 1974.

(SEAL)
Attest:

EDWARD M. FLETCHER, JR.
Attesting Officer

C. MARSHALL DANN
Commissioner of Patents